(12) United States Patent
Kreischer et al.

(10) Patent No.: US 9,248,625 B2
(45) Date of Patent: Feb. 2, 2016

(54) MULTILAYER FILM, USE OF A MULTILAYER FILM AND PROCESS FOR PRODUCING A MULTILAYER FILM

(75) Inventors: Thomas Kreischer, Saarbruecken (DE); Joern Hoermann, Heusweiler (DE); Franz Kugelmann, St. Wendel/Bliesen (DE)

(73) Assignee: FRESENIUS MEDICAL CARE DEUTSCHLAND GMBH, Bad Homburg (DE)

( * ) Notice: Subject to any disclaimer, the term of this patent is extended or adjusted under 35 U.S.C. 154(b) by 346 days.

(21) Appl. No.: 13/640,822

(22) PCT Filed: Mar. 22, 2011

(86) PCT No.: PCT/EP2011/054313
§ 371 (c)(1),
(2), (4) Date: Dec. 12, 2012

(87) PCT Pub. No.: WO2011/128185
PCT Pub. Date: Oct. 20, 2011

(65) Prior Publication Data
US 2013/0072895 A1    Mar. 21, 2013

(30) Foreign Application Priority Data

Apr. 13, 2010   (DE) .......................... 10 2010 014 785

(51) Int. Cl.
*A61B 19/00*   (2006.01)
*B32B 7/02*   (2006.01)
(Continued)

(52) U.S. Cl.
CPC ... *B32B 7/02* (2013.01); *A61J 1/10* (2013.01); *B29C 47/0004* (2013.01);
(Continued)

(58) Field of Classification Search
CPC ............ B32B 5/00; B32B 7/02; B32B 25/14; B32B 27/08; B32B 27/28; B32B 27/32; A61J 1/10; B29C 47/06; B29C 47/0021; C08L 51/00; C08L 51/02; Y10T 428/24975; Y10T 428/24967; Y10T 248/24942; Y10T 428/269; Y10T 428/265
USPC .......... 604/403–413; 428/215, 216, 336–339; 524/575–578; 252/95–98, 240, 241, 252/575
See application file for complete search history.

(56) References Cited

U.S. PATENT DOCUMENTS 5,616,420 A    4/1997 Yamaoka et al.
2009/0299260 A1*  12/2009 Kreischer et al. ............ 604/4.01
2010/0280485 A1*  11/2010 Choi et al. .................... 604/410

FOREIGN PATENT DOCUMENTS

CN    1107779 A    9/1995
CN    101415552 A    4/2009
(Continued)

OTHER PUBLICATIONS

International Search Report of PCT/EP2011/054313 (Jun. 9, 2011).
(Continued)

*Primary Examiner* — Philip R Wiest
(74) *Attorney, Agent, or Firm* — The Dobrusin Law Firm, P.C.

(57) ABSTRACT

A multilayer film for medical purposes is proposed, with one or two external layers, wherein the external layers contain: a first polyalphaolefin; a first thermoplastic elastomer with a melt viscosity of a melt flow index according to ISO 1133 of from 0.001 to 6 g/10 min at 230° C., 2.16 kg; and a second thermoplastic elastomer with a high melt viscosity not measurable according to ISO 1133 which is higher than the melt viscosity of the first thermoplastic elastomer.

19 Claims, 5 Drawing Sheets

Figure 1:
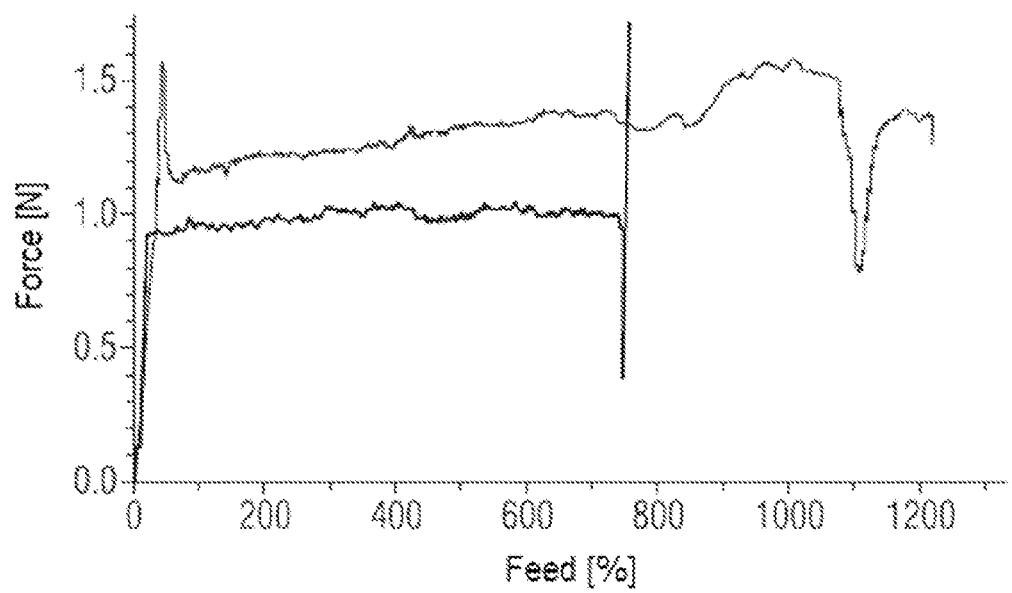

(51) Int. Cl.
  *B32B 25/14*   (2006.01)
  *B32B 27/08*   (2006.01)
  *B32B 27/28*   (2006.01)
  *B32B 27/32*   (2006.01)
  *A61J 1/10*    (2006.01)
  *B29C 47/00*   (2006.01)
  *B29C 47/06*   (2006.01)
  *B32B 5/00*    (2006.01)
  *C08L 25/08*   (2006.01)
  *C08L 25/10*   (2006.01)
  *C08L 53/00*   (2006.01)
  *C08L 53/02*   (2006.01)

(52) U.S. Cl.
  CPC .......... *B29C 47/0021* (2013.01); *B29C 47/06* (2013.01); *B32B 5/00* (2013.01); *B32B 25/14* (2013.01); *B32B 27/08* (2013.01); *B32B 27/28* (2013.01); *B32B 27/32* (2013.01); *C08L 25/08* (2013.01); *C08L 25/10* (2013.01); *C08L 53/00* (2013.01); *C08L 53/02* (2013.01); *Y10T 428/24942* (2015.01); *Y10T 428/24967* (2015.01); *Y10T 428/24975* (2015.01); *Y10T 428/265* (2015.01); *Y10T 428/269* (2015.01)

(56) References Cited

FOREIGN PATENT DOCUMENTS

| | | |
|---|---|---|
| EP | 0641647 A2 | 3/1995 |
| WO | WO 2007/115802 A2 | 10/2007 |
| WO | WO 2009/082132 A2 | 7/2009 |

OTHER PUBLICATIONS

International Preliminary Report on Patentability for PCT/EP2011/054313 (Oct. 16, 2012).

* cited by examiner

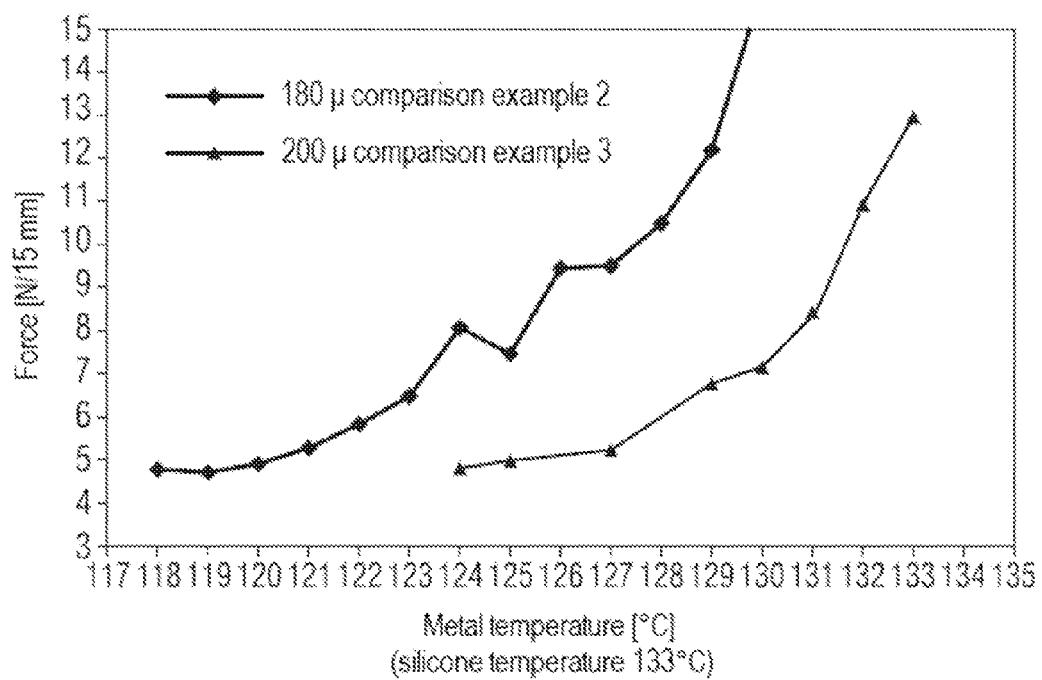

MULTILAYER FILM, USE OF A MULTILAYER FILM AND PROCESS FOR PRODUCING A MULTILAYER FILM

The present invention relates to a multilayer film for medical purposes, a use of the multilayer film for producing bags for accommodating blood or blood components or medical solutions, a use of the multilayer film in medical pumps and a process for producing the multilayer film. The invention further relates to the use of the multilayer film for producing a multi-chamber bag for use in haemodialysis or peritoneal dialysis or a haemodialysis or peritoneal dialysis device, in particular as a container for a dialysis fluid in a haemodialysis or peritoneal dialysis device.

Haemodialysis or peritoneal dialysis devices are known in various versions. The exchange of substances in haemodialysis and other extracorporeal blood treatment therapies between the blood and the dialysis fluid takes place in a dialyzer which has a first flow path for the blood and a second flow path for the dialysis fluid, wherein both flow paths are normally separated from each other by a semi-permeable membrane. The first flow path is part of an extracorporeal blood circulation system with a feed line and a return line for the blood and also optionally a pump supporting the blood flow. The second flow path is connected to equipment feeding and removing the dialysis fluid.

In addition to the so-called single-path systems in which the continuously fed dialysis fluid passes through the dialyzer only once and is then discarded, so-called batch systems are known. DE 31 15 665 C2 describes such a haemodialysis device which operates with a fixed-volume container sealed off from the atmosphere which is completely filled with fresh dialysis fluid prior to the start of the treatment. During operation, the fluid is pumped out of the container through the dialyzer and the used fluid is passed back into the container.

Fresh and used dialysis fluid are prevented from mixing in the case of the known haemodialysis device by removing the dialysis fluid in the upper area of the container and returning it in the lower container area. The underlaying of the fresh dialysis fluid with the used dialysis fluid remains stable through the maintaining of a vertical temperature gradient in the container from top to bottom.

The container consists of glass which, because of the pore-free surface, has favourable properties as regards hygiene and bacteriology compared with other materials. In addition, glass is largely resistant to chemicals coming into consideration, can be satisfactorily cleaned and is physiologically harmless. However, the handling of such a repeatedly re-usable glass container proves to be laborious because the glass container needs to be disinfected before the renewed dialysis treatment.

U.S. Pat. No. 4,767,526 likewise describes a dialysis device in which the dialysis fluid is provided in a container. In order to avoid disinfection, it is proposed to line the container with a flexible bag which is disposed of after use.

Flexible plastic bags which consist of two films lying flat one over the other and welded together at their edges are known as containers for accommodating medical fluids.

DE 19825158 C1 likewise describes a disposable bag for a haemodialysis device or a device for peritoneal dialysis which preferably has a concentrate for the preparation of dialysis fluid. This bag can consist of a chamber in which the used fluid is layered underneath the fresh dialysis fluid in the course of the dialysis process. Alternatively, the disposable bag can also contain a film which divides the bag into two chambers, wherein the fresh dialysis fluid is present in one chamber of the bag and the used fluid is passed into the other chamber during the dialysis process.

A disadvantage of the above-named glass containers is that a rapid re-use is not possible because of the laborious disinfection step. However, disposable bags, which render this disinfection step superfluous, have not yet solved the problem that in the case of introduced granular material to be dissolved in water the different constituents of the granular material react with each other during the storage of the bag including granular material, with the result that there is no storage stability over a certain period of time. In addition, dialysis fluids which are prepared by dissolving granular material which contains all the necessary constituents often have the problem that, as a result of an undesired reaction of different constituents, not all of the granular material dissolves. Furthermore, it is important to correspondingly control the pH while solvent is being poured into the bag with granular material, so that undesired precipitations are avoided during the dissolution of the granular material in the fluid. If the named problems occur, the dialysis fluid is not suitable for haemodialysis or peritoneal dialysis and must be discarded together with the bag.

In addition to glucose and physiologically essential salts or ions, dialysis fluids should advantageously have a pH in the physiological range (pH between 6.5 and 7.6). Bicarbonate should preferably be used as therapeutically required buffer component in the dialysate. An acid component is required to adjust this naturally base-reacting buffer to a physiological value during dissolution. As a rule, therefore, an acid component and a bicarbonate-containing component are first introduced in the case of bicarbonate-containing dialysis solutions. When the aqueous parts of these components are intermixed the ready-to-use dialysis fluid buffered in the physiological range forms. The basic and the acid component must be physiologically compatible in intermixed form. The solution can also contain calcium and magnesium ions, in addition to sodium and potassium ions, as physiologically essential ions. In batch dialysis, the volume of dialysis fluid required for one treatment unit is introduced in its entirety. In other processes, the dialysate is produced online on the dialysis machine. A dialysis fluid is most often prepared from a single concentrate which is introduced in the disposable bag in the case of DE 198 25 158. If such concentrates which contain readily soluble calcium or magnesium salts and, as basic buffer component, a (bi)carbonate salt are stored for a prolonged time, then the problem arises, at least under atmospheric humidity conditions, that the components react with each other and thus poorly soluble calcium or magnesium carbonate can form. Likewise, poorly soluble calcium or magnesium carbonate precipitates from a solution the pH of which is not set in the ideal range of preferably <pH 8. It is therefore disadvantageous to introduce a concentrate with all the necessary physiologically essential components in a bag together, since such systems cannot be stored for long, because of the above-named problems, and because during dissolution in a fluid there is a pH greater than 8 in parts of the solution, with the result that undesired precipitations occur.

According to the German patent application with the application number DE 102009058445, the full disclosure of which is contained here through reference, multi-chamber bags which make it possible to dissolve or mix a concentrate in/with a fluid by breaching a separating device between chambers of the multi-chamber bag and dissolving and/or mixing the concentrate in or with the fluid are therefore used for medical purposes. If the multi-chamber bag contains a total of at least two chambers, concentrates of the same or different composition can be present in these. By breaching the separating device between the chambers of the bag, a resultant chamber forms, the volume of which comprises the sum of the volumes of the chambers of the multi-chamber bag. In this way, different substances and/or fluids from different chambers can be brought into contact with one another only upon preparation after the breaching of the separating device.

A film bag consisting of a flexible plastic film is suitable as a multi-chamber bag. The film bag is formed for example from a single-layer or multilayer plastic film, wherein the innermost film layer is a weldable film layer. The separating device between the chambers of the bag is formed into a tear seam for example by welding two opposite inner film layers in the bag. Accordingly, in this connection, by tear seam is meant e.g. a linear welded joint of two opposite inner sides of the bag. The tear seam runs in the bag for example such that the chambers are present separated from each other, i.e. the interior spaces of the chambers do not connect. However, the tear seam is breached, for example by introducing a fluid, with the result that the previously separated spaces connect.

The tear seams of the bag are for example so-called peel seams. These are produced for example by heat treatment and the joining of two opposite film sections. Peel seams have the advantage that they are generally detachable without a film rupture.

The named bags are preferably film bags. For example, the bags are made from a film which consists of one piece. In other words, the film defining the external dimensions of the bag is made from one piece of film. The inside of the latter is preferably sterile. The state of the materials and items achieved by a method by which the materials and items are freed of living microorganisms is referred to as sterile. In practice, however, a complete sterilization is not one hundred percent certain. Therefore, by "sterilization" or the term "sterile" is meant a reduction in the number of microorganisms capable of multiplying by a factor determined according to the field of use. Inter alia is meant by this that the residual level of microorganisms capable of multiplying in one unit of sterilizing product is at most $10^{-6}$ colony-forming units, i.e. a maximum of one microorganism capable of multiplying may be contained in a million units of identically treated sterilizing product. The sterilization can be carried out by physical (thermal, irradiated) or chemical methods.

An example of a suitable bag consists of a single-layer or multilayer film. The innermost layer of the single-layer or multilayer film is a weldable film layer. A particularly desired separating device is, as mentioned above, a tear seam which is formed by welding two opposite innermost film layers and thus forms a peel seam. For example, the separating device is formed in that one chamber in the bag contains a feed opening for a fluid. By introducing the fluid, a pressure acts on the wall of the chamber having a tear or peel seam which is defined as above. The tear or peel seam is breached by this pressure, with the result that the contents of the chamber enter a different chamber, and all dissolved or partially dissolved concentrates from the chambers are mixed.

If one of the above-named bags is used in haemodialysis or peritoneal dialysis, then the chamber resulting after the breaching of the separating devices, the volume of which substantially comprises the sum of the volumes of all the chambers, represents for example a space for keeping fresh dialysis fluid. The thus-designed bag can be used in haemodialysis or peritoneal dialysis, in particular as container for keeping dialysis fluid in a haemodialysis or peritoneal dialysis device.

Such a bag should be capable of housing large volumes of fluids and being sufficiently elastically extensible. A film is therefore required which is suitable for producing large-volume, extensible bags. Films, in particular elastically extensible films which are suitable for use for bags in medical technology, should satisfy a series of desired requirements. Desired properties of such a film are for example: a suitability of the film material as medical film; a high flexibility, in order that a bag produced therefrom can house large-volume fill quantities e.g. up to approx. 70 l; a high extensibility, in order to be able to produce a bag capable of expansion; an elastic extension behaviour with a small tendency to plastic deformation; a plastic deformability, in order to be sufficiently thermoformable to form pockets; a heat sterilizability at e.g. temperatures of approx. 121° C.; a mechanical stability; a small blocking tendency, e.g. adhesion tendency, in order that opposite inner sides of a bag do not remain stuck to each other; and a good welding behaviour for the formation of peel and permanent weld seams. It is further desired for some applications that the film is free of polyethylene and/or polyethylene copolymers. The use of polyethylene and/or polyethylene copolymer packaging can be problematic to the extent that the formulations that are necessary for the regulatory approval process are often not made public by the manufacturers.

These requirements are often mutually dependent and in addition often act contrary to each other, with the result that there continues to be a need for a film with optimum properties.

The object is to provide an improved film, in particular a film which is suitable for producing large-volume, extensible bags.

In one embodiment, a multilayer film is therefore provided for medical purposes, with one or two external layers, wherein the external layers contain: a first polyalphaolefin; a first thermoplastic elastomer with a melt viscosity of a melt flow index according to ISO 1133 of 0.001 to 6 g/10 min at 230° C., 2.16 kg; and a second thermoplastic elastomer with a high melt viscosity not measurable according to ISO 1133 which is higher than the melt viscosity of the first thermoplastic elastomer.

Another embodiment relates to a use of the multilayer film for producing bags for accommodating blood or blood components or medical solutions, wherein the thickness of the further layer of the multilayer film is in a range of from 100 to 500 μm.

In a further embodiment, the multilayer film is used in medical pumps, wherein the thickness of the further layer of the multilayer film is in a range of from 50 to 150 μm.

According to one embodiment, one use of the multilayer film is provided for producing a multi-chamber bag for use in haemodialysis or peritoneal dialysis or a haemodialysis or peritoneal dialysis device, in particular as container for a dialysis fluid in a haemodialysis or peritoneal dialysis device.

In a further embodiment, processes for producing the multilayer film are provided, wherein the multilayer film is produced by coextrusion.

Further features and advantages result from the following description of embodiments, the figures and the dependent claims.

All non-mutually exclusive features described here of embodiments can be combined with one another. Identical elements of the embodiments are given identical reference numbers in the following description. Elements of one embodiment can be used in the other embodiments without further mention.

Abbreviations used here for material components and their meanings are: PP polypropylene; PE polyethylene; PP-R polypropylene random copolymer; SIS styrene-isoprene-styrene copolymer; SEBS styrene-ethylene-butylene-styrene copolymer; SEBS styrene-ethylene-butylene-styrene copolymer; SEPS styrene-ethylene-propylene-styrene copolymer; SEEPS styrene-ethylene-ethylene-propylene-styrene copolymer; PE copolymer polyethylene copolymer.

By "multilayer film", also called film below, is meant in the present invention a film which consists of two or more layers of different or the same material which can be joined together by adhesion. It is preferred within the framework of the present invention that the multilayer film is built up of 2 to 10 layers, wherein a structure of 3 to 7 layers is more preferred and a structure of 3 to 5 layers is particularly preferred. The multilayer film can be produced according to any process which is known to a person skilled in the art as suitable for the purpose according to the invention, e.g. in a multilayer coextrusion blown film line, flat film extrusion line, multilayer coextrusion line, or multilayer lamination line.

In one embodiment, a multilayer film is provided for medical purposes, with one or two external layers, wherein the external layers contain: a first polyalphaolefin; a first thermoplastic elastomer with a melt viscosity of a melt flow index according to ISO 1133 of from 0.001 to 6 g/10 min at 230° C., 2.16 kg; and a second thermoplastic elastomer with a high melt viscosity not measurable according to ISO 1133 which is higher than the melt viscosity of the first thermoplastic elastomer. The melt flow index of the first thermoplastic elastomer can be in one of the following ranges: from 0.01 to 5.5; from 0.05 to 6; from 0.08 to 4.8; and from 0.01 to 5. The first polyalphaolefin can be present in the external layer as base component or matrix.

Within the framework of embodiments, a high melt viscosity not measurable according to ISO 1133 means that the melt viscosity is so high that it cannot or can no longer be meaningfully measured according to ISO 1133. The second thermoplastic elastomer with a high melt viscosity not measurable according to ISO 1133 is also called a no-flow component here. "No-flow" is a manufacturer's term. In the case of no-flow materials, the manufacturers do not quote melt flow index values. Within the framework of embodiments, by no-flow is meant a melt flow index which is so low that the ISO 1133 method does not produce characteristic values for the melt flow index. The first thermoplastic elastomer with a melt viscosity of a melt flow index according to ISO 1133 of from 0.001 to 6 g/10 min at 230° C., 2.16 kg is also called flow component here within the framework of embodiments and examples.

One or more of the abovenamed requirements for a film for medical purposes are satisfied by embodiments of the invention that are described here. According to embodiments, the multilayer film can preferably comprise three or more layers, preferably three to seven layers. In embodiments, the external layer or the two external layers of the film are chosen from a material which prevents damage to these layers—for example due to the handling of the film—from causing undesired predetermined breaking points, which leads to the tearing of the bag when the bag formed therefrom is subsequently filled and when the bag undergoes extreme extension. Accordingly, in embodiments the external layer(s) of the film, unlike one or more additional layers which are protected or surrounded by the external layer(s), are more robust vis-à-vis mechanical influences.

Furthermore, according to embodiments the film does not tend to stick during storage as a multi-chamber bag or during any heat sterilization. According to embodiments, the film simultaneously makes it possible to produce peel seams with a corresponding welding tool, preferably at relatively low temperatures. Peel seams are characterized in that they are produced by a partial welding or gluing of films by heat treatment and contact pressure. Preferably, therefore, the temperature for the formation of the peel seams lies below the welding temperature for permanent welded seams.

Depending on the choice of material for the external layer(s) and further layers, a film according to the invention can also have a high elastic extensibility without great exposure to force. However, previously known films tended in most cases to already form undesired gluing connections without a pressing-on effect of corresponding welding tools at a common heat sterilization temperature of 100 to 120° C., for 5 to 15 minutes (approx. 10 minutes) at a pressure between 1.5 and 2.5 bar (approx. 2 bar). However, such behaviour is avoided with the multilayer film according to embodiments.

The multilayer film according to embodiments furthermore makes possible a compromise between partially technically opposing requirements of heat sterilizability, adhesion behaviour, mechanical robustness, elastic extensibility, producibility of permanent and peelable joining seams and good severability of the film after heat treatment. It has surprisingly been shown that according to embodiments described here the connection between permanently welded seams can be broken only by peeling and not e.g. by film rupture or delamination. By "permanent" is meant in this context a connection strength of a weld seam which withstands the stresses, in particular the fill pressure, which occur in a large-volume bag of a fill volume of up to 120 l. By weld seams are meant in this context all seams which acquire their strength through heat treatment. Seams which acquire their strength only because of blocking mechanisms (surface adhesive forces, adhesions) are also included. As regards the elastic extensibility of the film and of the bag produced therefrom, according to embodiments described here the film enables an even extension to take place due to exposure to force or the filling of the bag. If the bag is extended unevenly, there is namely the risk that individual areas are over-extended while other areas are not, or less, extended.

In embodiments, the external layer or one of the external layers of the film serves as the layer which faces the inside of the subsequent bag. Further, in embodiments the external layer or one of the external layers serves as the layer which faces the outside of the subsequent bag. According to embodiments, the external layer or the external layers has/have three polymer components, wherein the three polymer components can comprise a base component and two further components. In other embodiments, the external layer or the external layers consists/consist substantially of the three polymer components and optional additives. In one example, the external layer(s) contains or contain the base component and the two further components. In another example, the external layer(s) contains or contain a matrix polymer for a matrix and two phase polymers as the three polymer components. For example, polymers with high excitation or melt temperature range, such as e.g. a polyalphaolefin, preferably a polypropylene homopolymer or a polypropylene copolymer, can be used as base component or matrix polymer. Of the named base components or matrix polymers, the polypropylene copolymer is preferred. A polypropylene random copolymer is particularly preferred. According to embodiments, thermoplastic elastomers of different melt viscosity are suitable as the two further components or phase polymers. For example, according to one embodiment the external layer comprises a first thermoplastic elastomer with a melt viscosity of a melt flow index according to ISO 1133 of from 0.001 to 6 g/10 min at 230° C., 2.16 kg; and a second thermoplastic elastomer with a high melt viscosity not measurable according to ISO 1133 which is higher than the melt viscosity of the first thermoplastic elastomer. The melt flow index of the first thermoplastic elastomer is preferably in one of the following ranges: from 0.01 to 5.5; from 0.05 to 6; from 0.08 to 4.8; and from 0.01 to 5.

According to embodiments, the external layer(s) of the multilayer film contains or contain a thermoplastic, preferably a polyalphaolefin, e.g. polypropylene, which can also be present in heterophase form. The thermoplastic can be present in the external layer(s) of the multilayer film as base component or matrix. Heterophase form means that different phases can be present. The composition, a heterogeneity and a heterophase structure of the external layer(s) support individually or in any combination a good peelability of the layers welded together, to be peeled in the subsequent bag. For example, a phase which is formed by the first thermoplastic elastomer and the second thermoplastic elastomer is contained in a base component or matrix formed from the polyalphaolefin. The external layer or external layers can be used under heat because of the composition according to the invention. The composition of the external layers makes it possible, in bags formed from multilayer films according to the invention, for dry concentrates to also be transported in chambers which are separated from one another by peelable weld seams, without coming into contact with one another. Only at the start of the treatment within the framework of a medical therapy can the chambers by peeled open by entering fluid, and thus form a large-volume bag.

In embodiments, the content of the first thermoplastic elastomer in the external layer can be 20 to 50 wt.-%, preferably 25 to 40 wt.-%, further preferably 25 to 35 wt.-% or 20 to 30 wt.-%. Further, according to embodiments, the content of the second thermoplastic elastomer in the external layer can be 2 to 20 wt.-%, preferably 5 to 15 wt.-%, further preferably 3 to 15 wt.-% or 4 to 10 wt.-%. The rest of the material of the external layer can contain essentially a thermoplastic at a level of 40 to 70%, preferably an alphaolefin polymer or copolymer, e.g. a PP. Alphaolefin polymers and copolymers include polymers with the following general monomer unit $CH_2CHR$:

wherein R can be: —H, -methyl, -ethyl, -propyl, -propyl isomers, -butyl and -butyl isomers, -octyl and -octyl isomers, in general aliphatic radicals with 0 to 20 carbon atoms. PP, PE, random copolymers and block copolymers of propylene, ethylene, butylene, octene and also blends of these polymers with one another, copolymers, and block copolymers of these polymers are particularly preferred.

According to embodiments, surprisingly the layer structure of the multilayer film, which comprises in the external layer(s) a polyalphaolefin, e.g. a heterophase polypropylene random copolymer, and two thermoplastic elastomers with different melting viscosities and molecular weights, makes it possible for the multilayer film to be peelable and heat-sterilizable, flexibly extensible and have further properties suitable for medical purposes. Above all, the external layer(s) in the multilayer film according to embodiments influence the extension behaviour, the peel behaviour and the adhesion to other film parts. In particular, the use according to the invention of the second thermoplastic elastomer highly viscous in the melt has a positive effect on the adhesion behaviour of the external layer. Furthermore, the proportion and the choice of the first thermoplastic elastomer of comparatively low viscosity in the melt result in a suitable peelability of weld seams which are formed between two external layers. A particularly suitable peel behaviour can be achieved in the external layer for example by a so-called heterophase polypropylene random copolymer, e.g. Bormed SC 220 CF Borealis or SC 820 CF Borealis, e.g. as base component or matrix. The proportions of the second thermoplastic elastomer highly viscous in the melt do not tend to stick as they are usually of high molecular weight.

Moreover, the materials of the multilayer film are selected in embodiments such that the bag is as transparent and flexible as possible, but is in particular biocompatible. On biocompatibility grounds and for environmental reasons, the use of PVC, which always contains some plasticizers, at least in the external layer which forms the inner wall of the bag after its manufacture, can be ruled out. For the same reasons, materials such as e.g. adhesion promoters, which can diffuse into the inside of the bag, can also be ruled out. In addition, it is desired for specific applications that the multilayer film has a gas barrier for oxygen and carbon dioxide and also a steam barrier which prevents a diffusion of these gases both into and out of the bag.

In embodiments, the first polyalphaolefin is selected from: polypropylene, polypropylene copolymer, polypropylene random copolymer, heterophase polypropylene random copolymer. Furthermore, in embodiments the first and/or the second thermoplastic elastomer is selected from: styrene block copolymers, hydrogenated styrene block copolymers, styrene-butadiene-styrene copolymer, styrene-isoprene-styrene copolymer, styrene-ethylene-butylene-styrene copolymer, styrene-ethylene-propylene copolymer, styrene-ethylene-propylene-styrene copolymer, styrene-ethylene-ethylene-propylene-styrene copolymer and styrene-ethylene-butylene copolymer.

According to a preferred embodiment, the first polyalphaolefin comprises a heterophase polypropylene random copolymer; and/or the first thermoplastic elastomer comprises a styrene-ethylene-butylene-styrene copolymer; and/or the second thermoplastic elastomer is selected from: styrene-ethylene-propylene-styrene copolymer, styrene-ethylene-ethylene-propylene-styrene copolymer.

According to one embodiment, the multilayer film comprises a further layer, wherein the further layer contains a third thermoplastic elastomer with a melt viscosity of a melt flow index according to ISO 1133 of from 0.001 to 6 g/10 min at 230° C., 2.16 kg and a second polyalphaolefin. The melt flow index of the third thermoplastic elastomer can lie in one of the following ranges: from 0.01 to 5.5; from 0.05 to 6; from 0.08 to 4.8; and from 0.01 to 5. The melt flow index of the second polyalphaolefin, e.g. PP, can be 3 to 8 g/10 min, 230° C., 2.16 kg. For example, the second polyalphaolefin, which can be a polypropylene and which forms the phase of the further layer, has a melt viscosity of a melt flow index according to ISO 1133 of 4 g/10 min. It can be preferred in a multilayer composite of the film according to the invention that all layers have an approximately similar extension behaviour. The use of the film is provided for bags in which sections of the bag wall can be extended by filling by several times the starting measurements. If the layers were to extend by different amounts when subjected to stress, delamination could possibly be observed. Mechanical strengths such as tear strength or impact resistance would be reduced. In addition to the requirements in respect of the extension behaviour, it can be preferred that the external layer or external layers have a slight blocking tendency (adhesion under heat and pressure) while simultaneously being weldable.

The materials of the further layer according to embodiments, which is for example a middle layer arranged between two of the external layers described here, make possible a particularly desired flexibility of the multilayer film and result in the property of the further layer that it largely elastically absorbs an extension energy. For example, the further layer with 70 wt.-% SEBS (styrene-ethylene-butylene-styrene copolymer) and 30 wt.-% of a random polypropylene containing 4 wt.-% ethylene results in a particularly suitable extension behaviour of the multilayer film. An improvement of the dimensional stability of the multilayer film during a heat sterilization can be effected in that the third thermoplastic elastomer in the melt is of low viscosity.

In embodiments, the content of the third thermoplastic elastomer in the further layer can be 40 to 90 wt.-%, preferably 50 to 80 wt.-%, still more preferably 55 to 75 wt.-%, and/or the content of the polyalphaolefin in the further layer can be 10 to 60 wt.-%, preferably 25 to 45 wt.-%.

In a multilayer film according to embodiments described here the third thermoplastic elastomer is selected from: styrene block copolymers, hydrogenated styrene block copolymers, styrene-isoprene-styrene copolymer, styrene-ethylene-butylene-styrene copolymer, styrene-ethylene-propylene copolymer, styrene-ethylene-propylene-styrene copolymer and styrene-ethylene-ethylene-propylene-styrene copolymer. In embodiments, the second polyalphaolefin is selected from polypropylene, polypropylene copolymer, polypropylene random copolymer, which can be in heterophase form, and polypropylene homopolymer, and optionally comprises an ethylene comonomer. For example, they are copolymers built up in blocks, with styrene blocks and blocks consisting of copolymerisates of propyl, butyl and/or ethyl repeating units.

According to a preferred embodiment, the third thermoplastic elastomer comprises a styrene-ethylene-butylene-styrene copolymer, and/or the second polyalphaolefin comprises a polypropylene random copolymer or a polypropylene random copolymer with ethylene as comonomer.

In embodiments described here, the multilayer film has two external layers and the further layer is arranged between the two external layers.

Embodiments of the multilayer film comprise one or two external layers each with a thickness of approximately 5 to 20 μm, 7 to 20 μm, 10 to 20 μm, 7 to 18 μm and 7 to 15 μm, wherein the further layer can have a thickness of approximately 50 to 500 μm, preferably 50 to 150 μm.

In addition, in embodiments described here the multilayer film can have an additives content of less than 5000 ppm or less than 200 ppm in one external layer or in the two external layers and/or in the further layer.

In one embodiment, the multilayer film has an elongation at tear in longitudinal direction of the extrusion of the film of 300% to 750%, preferably 350% to 700%, more preferably 500% to 700% and most preferably 600% to 700%, and in transverse direction of the extrusion of the film of 300% to 750%, preferably 350% to 700%, more preferably 500% to 700% and most preferably 600% to 700%. By elongation at tear, also called elongation at break, is meant the percentage ratio of the change in length ΔL (at break) to the starting length and is a measure of the maximum tensile strain before the film tears. It expresses the capacity of a material to follow changes in shape without cracking. The elongation at tear is measured by a tensile test according to DIN EN ISO 527-3 using a sample strip 15 mm wide, a clamped length of 50 mm, a pre-stress force of 0.5 N and a feed rate of 200 mm/min.

An ability to change length in longitudinal direction of the extrusion of the film in the abovenamed range means that a bag produced therefrom undergoes a change in volume when it is filled with or emptied of dialysate (used or fresh) without cracking below the upper limits. This also means that when unfilled only a small amount of material is required, but there is nevertheless a large volume capacity when filled. A product can thereby be provided which entails only a small amount of waste. This is particularly desirable for environmental reasons.

Furthermore, in embodiments the multilayer film can have, preferably in longitudinal direction, a tear strength, also called tensile strength, of 20 N/mm² to 50 N/mm², preferably 25 N/mm² to 42 N/mm², more preferably 30 to 42 N/mm², and further preferably 35 N/mm² to 42 N/mm², and in transverse direction of the extrusion of the film of 10 N/mm² to 40 N/mm², preferably 15 N/mm² to 36 N/mm², more preferably 20 to 36 N/mm², even more preferably 25 to 36 N/mm², and further preferably 30 N/mm² to 36 N/mm².

By "tear strength" is meant the tensile stress which is exerted on an object at the moment of tearing. Tear strength is measured in a tensile test according to DIN EN ISO 527-3, using a sample strip 15 mm wide, a clamped length of 50 mm, a pre-stress force of 0.5 N and a feed rate of 200 mm/min. A tear strength below a lower limit is disadvantageous, as the bag otherwise tears prematurely through overextension. Above an upper limit of tear strength, although the bag is very tear-resistant it is not sufficiently extensible.

According to embodiments, the multilayer film can also be extended by 100% by a force of approximately 10 N, by 400% by one of approximately 20 N and by 600% by one of approximately 55 N. Extensibility was measured here using a tensile test according to DIN EN ISO 527-3, using a sample strip 15 mm wide, a clamped length of 50 mm, a pre-stress force of 0.5 N and a feed rate of 200 mm/min. A high extensibility of the multilayer film has the advantage that the bag is small in size when unfilled and is thus easy to handle. In addition, the material requirement is small as a result of the marked extensibility of the material. A simpler manufacture and packaging of the material are thus also made possible.

Examples of embodiments described here are the three-layer films below which are divided into film types. In these examples, one of the two external layers is called the inner layer, i.e. the layer surrounding the inside of the bag to be formed therefrom.

Film type 1:Inner layer: layer thickness: 10 to 20 μm, 10 wt.-% styrene-ethylene-propylene-styrene copolymer Septon 2005, Kuraray (no-flow), 30 wt.-% styrene-ethylene-butylene-styrene copolymer Septon 8004 (melt viscosity<0.1 g/10 min (230° C., 2.16 kg), and 60 wt.-% random polypropylene Bormed SC 820 Borealis Middle layer: layer thickness: 80 to 150 μm, 30 wt.-% styrene-ethylene-butylene-styrene copolymer Tuftec 1062 Asahi (melt viscosity of approximately 4 g/10 min), 70 wt.-% random polypropylene PP-R RD808 Borealis External layer: analogous to the inner layer Film type 2:Inner layer: layer thickness: 10 to 20 μm, styrene-ethylene-ethylene-propylene-styrene copolymer Septon 4077 Kuraray (no-flow), 30 wt.-% styrene-ethylene-butylene-styrene copolymer Tuftec 1062 Asahi (melt viscosity of approximately 4 g/10 min), 60 wt.-% random polypropylene Bormed SC 820 Borealis Middle layer: layer thickness: 80 to 150 μm, 70 wt.-% styrene-ethylene-butylene-styrene copolymer Kraton 1645MO Kraton polymers (melt viscosity of approximately 4 g/10 min), 30 wt.-% random polypropylene PP-R RD808 Borealis External layer: analogous to the inner layer Film type 3: Inner layer: layer thickness: 10 to 20 µm, 15 wt.-% styrene-ethylene-propylene-styrene copolymer Septon 2005 Kuraray (no-flow), 25 wt.-% styrene-ethylene-butylene-styrene copolymer Kraton 1645MO Kraton polymers, and 60 wt.-% random polypropylene Bormed SC 820 Borealis Middle layer: layer thickness: 80 to 150 µm, 70 wt.-% styrene-ethylene-butylene-styrene copolymer Septon 8004 Kuraray, 30 wt.-% random polypropylene, PP-R RD808 Borealis External layer: analogous to the inner layer The multilayer film according to one of the embodiments described here can be used for producing bags for accommodating blood or blood components or medical solutions, wherein the thickness of the further layer of the multilayer film is preferably in a range of from 100 to 500 µm. Furthermore, the multilayer film according to one of the embodiments described here can be employed for use in medical pumps, wherein the thickness of the further layer of the multilayer film is preferably in a range of from 50 to 150 µm. A further use of the multilayer film according to embodiments is in the production of a multi-chamber bag for use in haemodialysis or peritoneal dialysis or a haemodialysis or peritoneal dialysis device, in particular as container for a dialysis fluid in a haemodialysis or peritoneal dialysis device.

According to another embodiment, a process for producing the multilayer film according to one of the embodiments described here is provided, wherein the multilayer film is produced by coextrusion.

Figure 2:
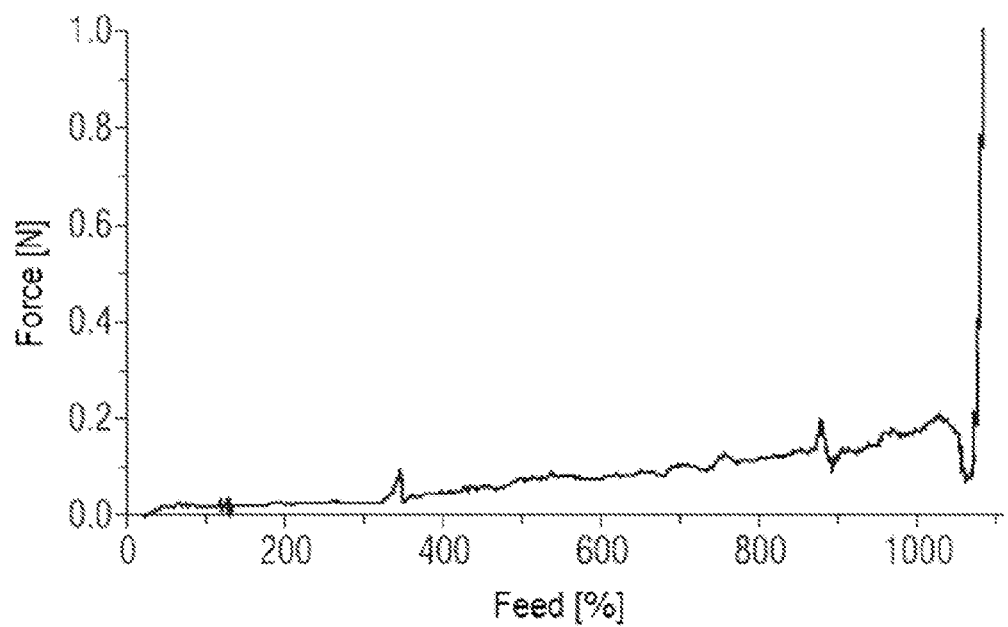
Figure 3:
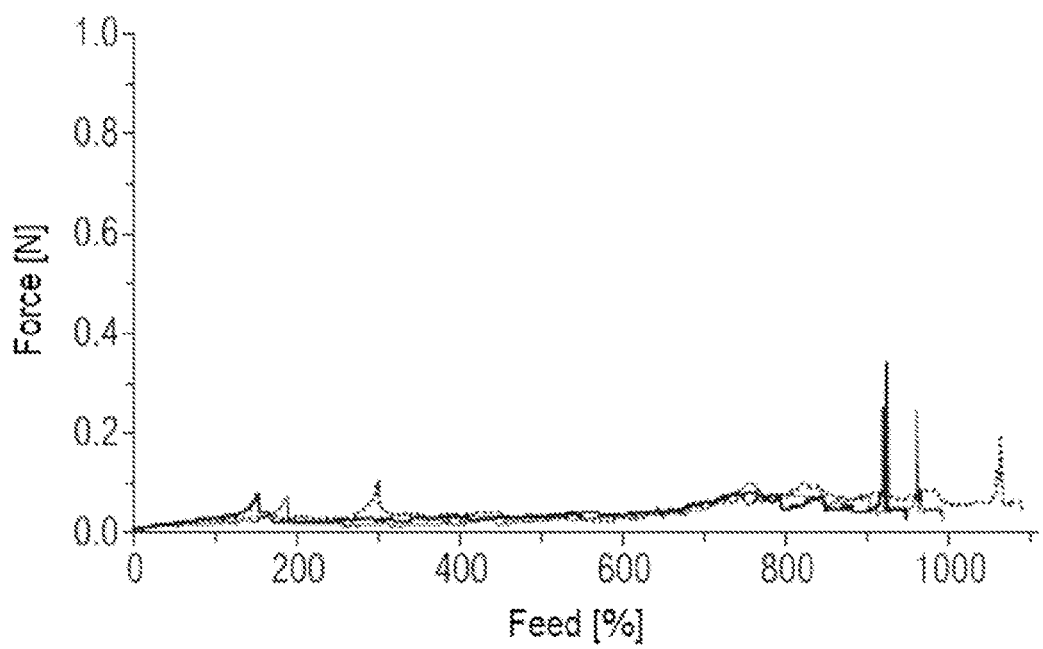
Figure 4:
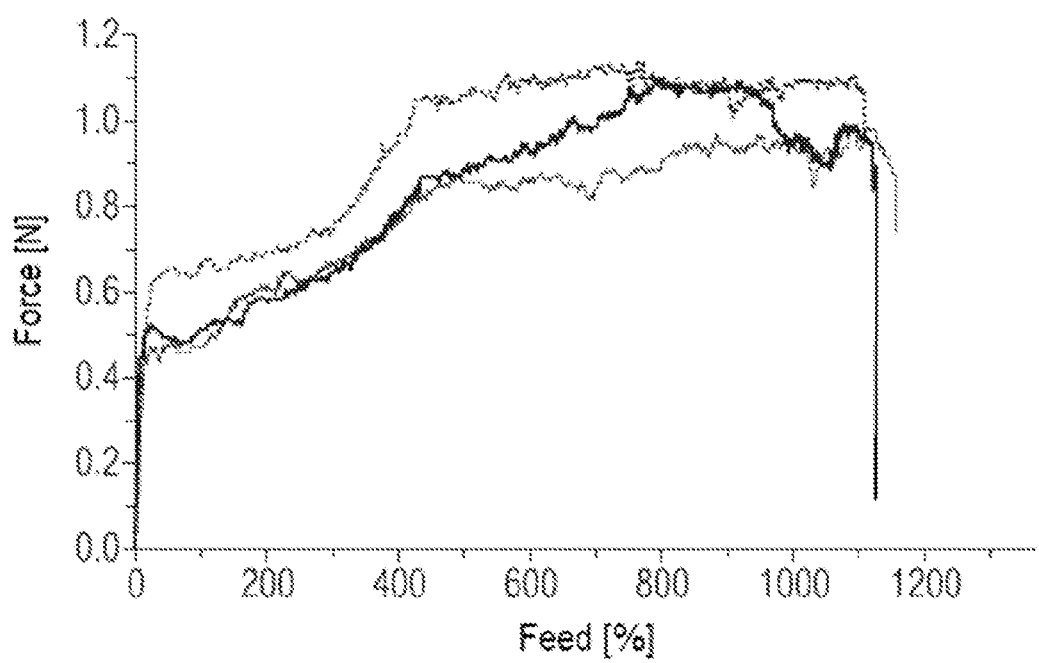
Figure 5:
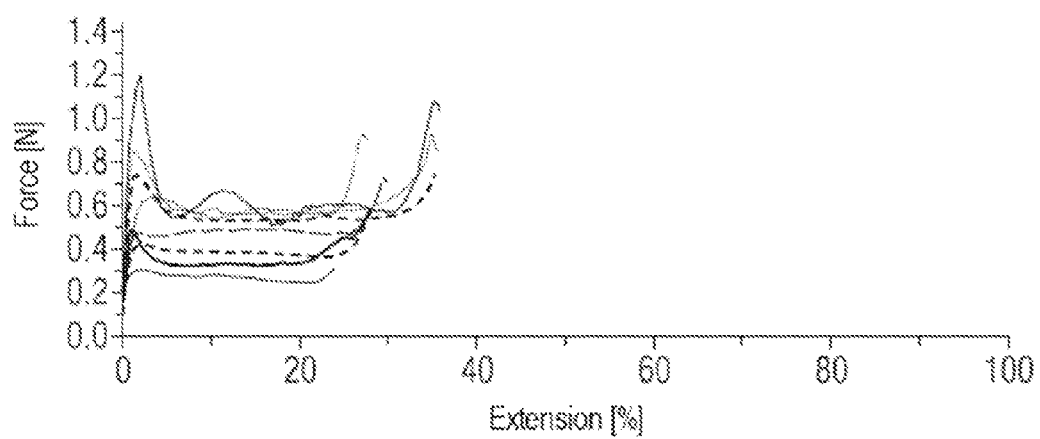
Figure 6:
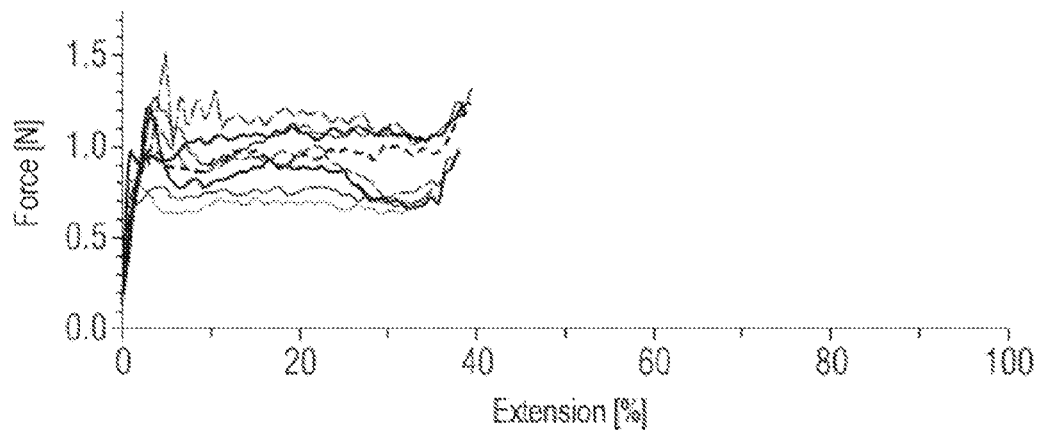
Figure 7:
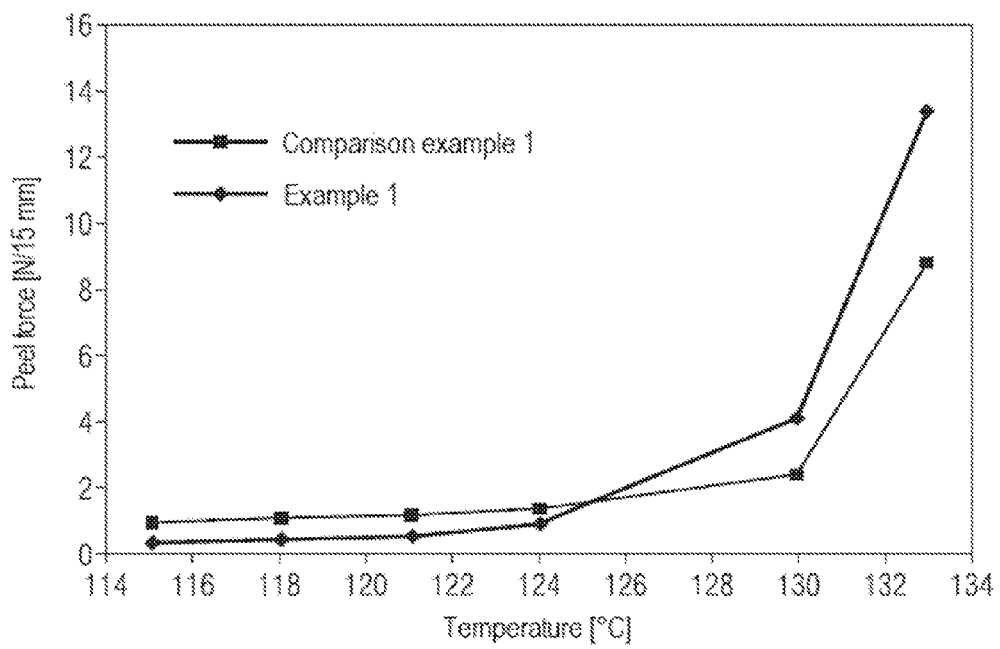
Figure 8:
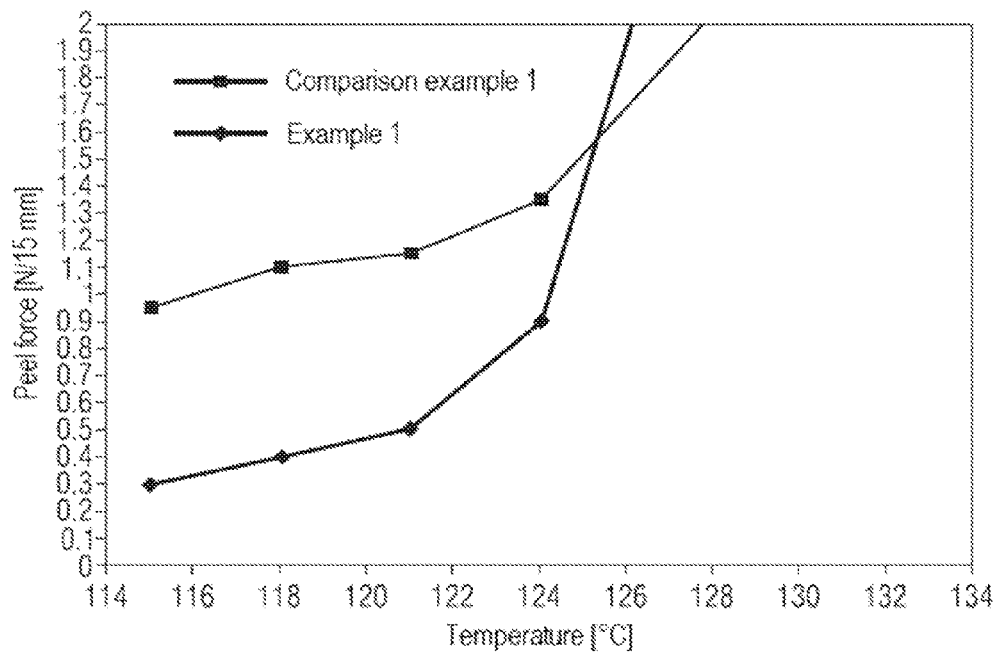

Further examples of embodiments are described below with reference to the figures. The figures show:

FIG. 1 a blocking measurement for a film of an example;
FIG. 2 a blocking measurement for a film of an example;
FIG. 3 a blocking measurement for a film of an example;
FIG. 4 a blocking measurement for a film of an example;
FIG. 5 the peel force in N as a function of the extension in % for a film of an example;
FIG. 6 the peel force in N as a function of the extension in % for a film of an example;
FIG. 7 the peel forces of two films of examples as a function of temperature during the production of peel seams;
FIG. 8 an enlargement of FIG. 7 in the range of 114 to 124° C.; and
FIG. 9 the peel forces of two films of examples as a function of temperature during the production of peel seams.

EXAMPLES

For Examples 1 to 3, multilayer films were produced by coextrusion, while comparison films were used for Examples 4 to 6. The respective examples have the following layer structure:

Example 1

External layer: layer thickness: 10 µm
  60 wt.-% random polypropylene Bormed SC 220;
  5 wt.-% styrene-ethylene-butylene-styrene copolymer Septon 2005 Kuraray;
  35 wt.-% styrene-ethylene-butylene-styrene copolymer Septon 8004 Kuraray
Middle layer: layer thickness: 100 µm
  70 wt.-% of a mixture of 60 wt.-% styrene-ethylene-butylene-styrene copolymer Septon 8004 Kuraray, 40 wt.-% random polypropylene with 4 wt.-% ethylene, PP-R RD 204 Borealis;
  30 wt.-% styrene-ethylene-butylene-styrene copolymer Tuftec H 1221
External layer: layer thickness: 10 µm
  60 wt.-% random polypropylene Bormed SC 220;
  5 wt.-% styrene-ethylene-butylene-styrene copolymer Septon 2005 Kuraray;
  35 wt.-% styrene-ethylene-butylene-styrene copolymer Septon 8004 Kuraray Example 2

External layer: layer thickness: 10 µm
  60 wt.-% random polypropylene Bormed SC 220;
  5 wt.-% styrene-ethylene-butylene-styrene copolymer Septon 4077 Kuraray;
  35 wt.-% styrene-ethylene-butylene-styrene copolymer Septon 8004 Kuraray
Middle layer: layer thickness: 100 µm
  70 wt.-% of a mixture of 60 wt.-% styrene-ethylene-butylene-styrene copolymer Septon 8004 Kuraray, 40 wt.-% random polypropylene with 4 wt.-% ethylene, PP-R RD 204 Borealis;
  30 wt.-% styrene-ethylene-butylene-styrene copolymer Tuftec H 1221
External layer: layer thickness: 10 µm
  60 wt.-% random polypropylene Bormed SC 220;
  5 wt.-% styrene-ethylene-butylene-styrene copolymer Septon 4077 Kuraray;
  35 wt.-% styrene-ethylene-butylene-styrene copolymer Septon 8004 Kuraray Example 3

External layer: layer thickness: 10 µm
  60 wt.-% random polypropylene Bormed SC 220;
  20 wt.-% styrene-ethylene-butylene-styrene copolymer Septon 8004 Kuraray
Middle layer: layer thickness: 100 µm
  70 wt.-% of a mixture of 60 wt.-% styrene-ethylene-butylene-styrene copolymer Septon 8004 Kuraray, 40 wt.-% random polypropylene with 4 wt.-% ethylene, PP-R RD 204 Borealis;
  30 wt.-% styrene-ethylene-butylene-styrene copolymer Tuftec H 1221
External layer: layer thickness: 10 µm
  60 wt.-% random polypropylene Bormed SC 220;
  20 wt.-% styrene-ethylene-butylene-styrene copolymer Septon 8004 Kuraray Comparison Example 1

| External layer | PP/SEBS Layer thickness 8 µm | PP 40% RD 204 CF; Borealis SEBS 50% Septon 8004, Kuraray |
|---|---|---|
| Middle layer | PE/SEBS Layer thickness 97 µm | SEBS 25% Tuftec H1062, Asahi PE 40% Engage 8003, Dow SEBS 35% Septon 8004, Kuraray |
| External layer | PP/SEBS Layer thickness 15 µm | PP 40% RD 204 CF, Borealis SEBS 60% Septon 8004, Kuraray |

Comparison Example 2

| External layer | PP Layer thickness 20 μm | 100% polypropylene-ethylene copolymer 4-8% ethylene |
|---|---|---|
| Middle layer | PP/SEBS Layer thickness 120 μm | 60% SEBS/40% PP |
| External layer | PP Layer thickness 20 μm | 100% polypropylene |

Comparison Example 3

| External layer | PP Layer thickness 20 μm | 20% SEBS, 80% polypropylene-ethylene copolymer, ethylene content 4% |
|---|---|---|
| Middle layer | PP/SEBS Layer thickness 160 μm | 35% SEBS, 65% polypropylene-ethylene copolymer, ethylene content 4% |
| External layer | PP Layer thickness 20 μm | 100% polypropylene-ethylene copolymer, ethylene content 4% |

Test 1

In this experiment, a test was carried in order to determine the extension and adhesion behaviour of the films of Example 1 (1 piece), Example 2 (three pieces) and Example 3 (three pieces) compared with the film of comparison example 1 (two pieces) each of which had a thickness of 120 μm. The respective multilayer films were sterilized at 124° C. After sterilization, the adhesion behaviour of the multilayer films to one another was investigated with a tensile testing machine in a tensile test analogous to a "T" peel test using a 15-mm wide sample strip. The results are shown in FIGS. 1 to 4. The figures show blocking measurements. FIG. 1 shows tensile tests with the film of comparison example 1. FIG. 2 shows a tensile test with the film of Example 1. FIG. 3 shows tensile tests with the film of Example 2 and FIG. 4 shows tensile tests with the film of Example 3.

In the tensile tests, the adhesion of multilayer films laid on top of one another was measured. In order to obtain information about the adhesion behaviour, multilayer films were laid on top of one another according to the bag design, loaded with a weight of a force of approximately 200 to 400 N/mm², repacked and sterilized for 10 min at 124° C. and 100% relative air humidity. By bag design is meant here that 2 pieces of the respective multilayer film were laid on top of one another in order to reproduce conditions experienced by a sample bag. The force from the respective tensile test for a 15-mm wide film test strip of the bag design is reproduced on the X-axis of FIGS. 1 to 4. The degree of feed of the clamping jaws is shown on the Y-axis of FIGS. 1 to 4. A high speed in N as a function of feed in % means that the 2 pieces of the respective multilayer film are adhering to each other. As FIGS. 1 and 4 show, high forces were measured for the films of comparison example 1 and Example 3. In contrast, low forces were measured for the films of Examples 1 and 2 which therefore scarcely display adhesion of the respective multilayer film to itself. The films of Examples 1 and 2 therefore display no adhesion after storage.

Tests 2 and 3

In test 2, peel seams were produced in each case with the films of Example 1 and comparison example 1 at the same temperatures and the peel forces of the peel seams compared. The comparisons were carried out by measuring the peel forces, i.e. the forces that are required to peel weld seams. Furthermore, in test 3, in order to ascertain sealing temperature curves, peel seams of the films of Example 1 and comparison example 1 and the films of comparison examples 2 and 3 were produced at different temperatures and the associated peel forces compared. Here, sealing temperature curves denote the peel forces as a function of temperature during production of the peel seams.

To produce the peel seams, a Hot Tack heat sealing machine (Brugger) with upper metal jaws and lower silicone jaws which were settable to different temperatures was used. In each case, the welding was carried out for a few seconds with a pressure power of 495 N and a welding pressure of from 0.1 to 3 N/mm².

Test 2

The peel seams of the films of Example 1 and comparison example 1 were produced from 15 mm-wide test strips in the Hot Tack heat sealing machine with an upper jaw temperature of 118° C., a lower jaw temperature of 80° C. and a welding time of 3 s. The produced peel seams were then tested in the T-Peel test procedures. The tensile tests were carried out based on DIN EN ISO 527-3. The test strip was clamped such that a "T" shape forms through the test strip. The test was carried out under the following conditions:

Feed rate of 200 mm/min
Measurement of the maximum force occurring in the peel test
Clamped length of the test strip: 50 mm
Set preliminary force: 0.5 N
Sample width: 15 mm Tables 1 and 2 and FIGS. 5 and 6 show the measurement results of the tests, wherein in each case 8 pieces of the different films were tested. The lines in the force/extension diagrams of FIGS. 5 and 6 denote the test runs for the individual films of nos. 1 to 8 or 9 to 16 which were used for the tests. The term peel force, called tensile strength in Tables 1 and 2, corresponds to the force which was measured as the force required to detach the peel seams in each case.

TABLE 1

Peel seams bag Example 1 - (FIG. 5):
Welding parameters: upper 118° C., lower 80° C., t = 3 s

| Film no. | Note | Tensile strength N (15 mm) |
|---|---|---|
| 1 | Example 1 | 0.3 |
| 2 | | 0.9 |
| 3 | | 0.8 |
| 4 | | 0.5 |
| 5 | | 0.7 |
| 6 | | 1.2 |
| 7 | | 0.9 |
| 8 | | 0.6 |

TABLE 2

Peel seams bag comparison example 1 - (FIG. 6):
Welding parameters: upper 118° C., lower 80° C., t = 3 s

| Film no. | Note | Tensile strength N (15 mm) |
|---|---|---|
| 9 | Comparison example 1 | 1.2 |
| 10 | | 1.2 |
| 11 | | 1.3 |

TABLE 2-continued

Peel seams bag comparison example 1 - (FIG. 6):
Welding parameters: upper 118° C., lower 80° C., t = 3 s

| Film no. | Note | Tensile strength N (15 mm) |
|---|---|---|
| 12 | | 0.8 |
| 13 | | 1.2 |
| 14 | | 1.2 |
| 15 | | 1.5 |
| 16 | | 0.8 |

FIG. 5 and Table 1 show the measurement results for the film of Example 1, while FIG. 6 and Table 2 show the measurement results for the film of comparison example 1. These two films have a comparable softness and flexibility. The film of Example 1 produces peel forces of approx. 0.3 to 1.2 N/15 mm, with a maximum mean value of 0.73 N/15 mm and a standard deviation of 0.28. The film of comparison example 1 produces peel forces of approx. 0.8 to 1.5 N/15 mm, with a maximum mean value of 1.15 N/15 mm and a standard deviation of 0.24. The film of Example 1 thus has lower peel forces compared with the film of comparison example 1. The peel seams of the film of Example 1 thus show an improved peelability or peel capacity.

Test 3

To produce peel seams in order to ascertain the sealing temperature curves, the Hot Tack heat sealing machine with upper metal jaws and lower silicone jaws was used. The upper jaw was set at various temperatures in the range of from 115 to 133° C., while the lower jaw was kept constant at 80° C. for the films of Example 1 and comparison example 1 and constant at 133° C. for the comparison test with the films of comparison examples 2 and 3. In each case, the welding was carried out for 5 seconds with a moulding pressure of 495 N and a welding pressure of 0.1 to 3 N/mm². FIGS. 7 to 9, wherein FIG. 8 reproduces an enlargement of FIG. 7 in the range 114 to 124° C., clearly show the comparatively smaller peel forces in the sealing temperature curve, i.e. the superior peelability, of the film of Example 1 compared with the films of comparison examples 1 to 3.

Test 3 also shows that peel seam force ranges of from 0.7 to 1.15 N/15 mm can be achieved only with very soft flexible films. More rigid films, such as those of comparison examples 2 and 3, do not permit a reasonably secure seam, as, due to the rigidity of the films, external forces act predominantly on the peel seams which therefore open unintentionally very easily. In contrast, peel seams of the film of Example 1, which displays small peel forces, can be produced securely due to their soft character and the fact that forces thus do not act directly on the seams, which thus do not tend to open unintentionally.

As was shown in test 1, the film of Example 1 also proved markedly better compared with the film of comparison example 1 in respect of the antistick effect when exposed to heat.

The invention claimed is:

1. A multilayer film for medical purposes comprising two external layers, and a further layer arranged between said two external layers,
   wherein each of said two external layers contains:
     a first polyalphaolefin;
     a first thermoplastic elastomer with a melt viscosity of a melt flow index according to ISO 1133 of 0.001 to 6 g/10 min at 230° C., 2.16 kg; and
     a second thermoplastic elastomer with a high melt viscosity not measurable according to ISO 1133 which is higher than the melt viscosity of the first thermoplastic elastomer; and
   wherein said further layer contains:
     a second polyalphaolefin; and
     a third thermoplastic elastomer with a melt viscosity of a melt flow index according to ISO 1133 of from 0.001 to 6 g/10 min at 230° C., 2.16 kg; and
   wherein
     the content of the first thermoplastic elastomer in each of said two external layers is 20 to 50 wt.-%, or
     the content of said second thermoplastic elastomer in each of said two external layers is 2 to 20 wt.-%, or
     the content of said first thermoplastic elastomer in each of said two external layers is 20 to 50 wt.-% and the content of said second thermoplastic elastomer in each of said two external layers is 2 to 20 wt.-%; and
   wherein the compositions of said two external layers are identical.

2. The multilayer film according to claim 1, wherein the content of the first thermoplastic elastomer in each of said two external layers is 20 to 50 wt.-%.

3. The multilayer film according to claim 1, wherein said first polyalphaolefin is selected from: polypropylene, polypropylene copolymer, polypropylene random copolymer, and heterophase polypropylene random copolymer.

4. The multilayer film according to claim 1, wherein said first polyalphaolefin comprises a heterophase polypropylene random.

5. The multilayer film according to claim 1, wherein each of said external layers has a thickness of 5 to 20 μm and said the further layer has a thickness of approximately 50 to 500 μm.

6. The multilayer film according to claim 1, wherein the content of said third thermoplastic elastomer in said further layer is 40 to 90 wt; and/or the content of said second polyalphaolefin in said further layer is 10 to 60 wt.

7. The multilayer film according to claim 1, wherein
   the third thermoplastic elastomer is selected from: styrene block copolymers, hydrogenated styrene block copolymers, styrene-isoprene-styrene copolymer, styrene-ethylene-butylene-styrene copolymer, styrene-ethylene-propylene copolymer, styrene-ethylene-propylene-styrene copolymer, and styrene-ethylene-ethylene-propylene-styrene copolymer; and/or
   said second polyalphaolefin is selected from polypropylene, polypropylene copolymer, polypropylene random copolymer, and polypropylene homopolymer, and/or said second polyalphaolefin comprises an ethylene comonomer.

8. The multilayer film according to claim 1, wherein
   said third thermoplastic elastomer comprises a styrene-ethylene-butylene-styrene copolymer, and/or
   said second polyalphaolefin comprises a polypropylene random copolymer or a polypropylene random copolymer with ethylene as comonomer.

9. The multilayer film according to claim 1, wherein
   each of said two external layers has a thickness of from 5 to 20 μm; and/or
   said further layer has a thickness of from 50 to 500 μm; and/or
   the multilayer film has at least one element selected from:
     an elongation at tear in longitudinal direction of an extrusion of the multilayer film of from 300% to 750%;

an elongation at tear in transverse direction of the extrusion of the multilayer film of from 300% to 750%;
a tear strength in longitudinal direction of the extrusion of the multilayer film of from 20 N/mm$^2$ to 50 N/mm$^2$, and
a tear strength in transverse direction of the extrusion of the multilayer film of from 10 N/mm$^2$ to 40 N/mm$^2$.

10. The multilayer film according to claim 1, wherein said two external layers and/or said further layer have an additives content of less than 5000 ppm.

11. The multilayer film according to claim 1, wherein the content of the second thermoplastic elastomer in each of said two external layers is 2 to 20 wt.-%.

12. The multilayer film according to claim 1, wherein said first thermoplastic elastomer and/or said second thermoplastic elastomer is selected from: styrene block copolymers, hydrogenated styrene block copolymers, styrene-butadiene-styrene copolymer, styrene-isoprene-styrene copolymer, styrene-ethylene-butylene-styrene copolymer, styrene-ethylene-propylene copolymer, styrene-ethylene-propylene-styrene copolymer, styrene-ethylene-ethylene-propylene-styrene copolymer and styrene-ethylene-butylene copolymer.

13. The multilayer film according to claim 1, wherein said first thermoplastic elastomer comprises a styrene-ethylene-butylene-styrene copolymer.

14. The multilayer film according to claim 1, wherein said second thermoplastic elastomer is selected from: styrene-ethylene-propylene-styrene copolymer and styrene-ethylene-ethylene-propylene-styrene copolymer.

15. The multilayer film according to claim 1, wherein the content of the third thermoplastic elastomer in said further layer is 55 to 75 wt.-%; and/or the content of said second polyalphaolefin in said further layer is 25 to 45 wt.-%.

16. A bag for accommodating blood or blood components or medical solutions, wherein said bag is made from a multilayer film according to claim 1, and wherein the thickness of said further layer of said multilayer film is in a range of from 100 to 500 μm.

17. A medical pump comprising a multilayer film according to claim 1, wherein the thickness of said further layer of said multilayer film is in a range of from 50 to 150 μm.

18. A multi-chamber bag for use in hemodialysis or peritoneal dialysis or in a hemodialysis or peritoneal dialysis device, wherein said bag is made from a multilayer film according to claim 1.

19. A process for producing a multilayer film according to claim 1, wherein said multilayer film is produced by coextrusion.

* * * * *